US008556773B2

(12) United States Patent
Oba (10) Patent No.: US 8,556,773 B2
(45) Date of Patent: Oct. 15, 2013

(54) CONTROL APPARATUS FOR VEHICULAR DRIVE SYSTEM

(75) Inventor: Mitsuru Oba, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 5 days.

(21) Appl. No.: 13/496,715

(22) PCT Filed: Oct. 5, 2009

(86) PCT No.: PCT/JP2009/067364
§ 371 (c)(1),
(2), (4) Date: Mar. 16, 2012

(87) PCT Pub. No.: WO2011/042951
PCT Pub. Date: Apr. 14, 2011

(65) Prior Publication Data
US 2012/0190499 A1 Jul. 26, 2012

(51) Int. Cl.
*B60W 10/04* (2006.01)
(52) U.S. Cl.
USPC .......................................................... 477/115
(58) Field of Classification Search
USPC ...................... 477/115, 35, 36, 101
See application file for complete search history.

(56) References Cited

U.S. PATENT DOCUMENTS

| 7,107,956 B2* | 9/2006 | McGee et al. | 123/179.3 |
| 2005/0263121 A1* | 12/2005 | Tamagawa et al. | 123/179.3 |
| 2010/0261578 A1* | 10/2010 | Fujii et al. | 477/115 |
| 2012/0108384 A1* | 5/2012 | Tabata et al. | 477/3 |

FOREIGN PATENT DOCUMENTS

| JP | A-2003-013767 | 1/2003 |
| JP | A-2005-029063 | 2/2005 |
| JP | A-2008-260492 | 10/2008 |

OTHER PUBLICATIONS

Nov. 2, 2009 International Search Report issued in International Patent Application No. PCT/JP2009/067364 (with translation).

* cited by examiner

*Primary Examiner* — David D Le
*Assistant Examiner* — David J Hlavka
(74) *Attorney, Agent, or Firm* — Oliff & Berridge, PLC (57) ABSTRACT

Providing a control apparatus for a vehicular drive system, which permits economical and easy reduction of generation of an abnormal sound upon starting of an engine in a running state of a vehicle. The control apparatus includes on-engine-starting differential limiting means for commanding a differential limiting clutch to limit differential rotary motion between front and rear drive wheels, in advance of automatic starting of an engine under the control of automatic engine starting control means. Accordingly, the limitation of the differential rotary motion between the front and the rear drive wheels by the differential limiting clutch ensures the starting of the engine without backlash which exists in the power transmitting path between the engine and the front and rear drive wheels, thereby permitting economical and easy reduction of generation of the abnormal sound upon starting of the engine in a running state of the vehicle.

3 Claims, 5 Drawing Sheets

| | C1 | C2 | C3 | B1 | B2 | F1 | SPEED RATIO | STEPPING RATIO |
|---|---|---|---|---|---|---|---|---|
| 1st | O | | | | (O) | O | 3.20 | |
| | | | | | | | | 1.86 |
| 2nd | O | | | O | | | 1.72 | |
| | | | | | | | | 1.72 |
| 3rd | O | O | | | | | 1.00 | |
| | | | | | | | | 1.49 |
| 4th | | O | | O | | | 0.67 | |
| Rev | | | O | | O | | 2.04 | GEAR RATIO SPREAD |
| N | | | | | | | | 4.76 |

CONTROL APPARATUS FOR VEHICULAR DRIVE SYSTEM

TECHNICAL FIELD

The present invention relates to a control apparatus for a vehicular drive system, which is configured to reduce generation of an abnormal sound upon starting of an engine in a running state of a vehicle.

BACKGROUND ART

There is known a vehicular drive system having first drive wheels and second drive wheels which are driven by an output of an engine transmitted thereto, and a differential limiting device constructed to limit a differential rotary motion between the first and second drive wheels. Patent Document 1 shows an example of such a vehicular drive system. This Patent Document 1 discloses a four-drive-wheel hybrid vehicle wherein an output of a drive power source having an engine and electric motors is distributed through a transfer device to front drive wheels and rear drive wheels.

PRIOR ART DOCUMENT

Patent Document 1: JP-2005-29063 A

SUMMARY OF THE INVENTION

Object Achieved by the Invention

In the conventional vehicular drive system described above, an automatic engine starting control for automatically starting the engine may be implemented when a predetermined condition for automatically starting the engine is satisfied in a motor drive mode of the vehicle while the engine is held at rest. Upon this automatic starting of the engine, which causes a comparatively large drive torque to be transmitted to a power transmitting path between the engine and the first and second drive wheels, an abnormal sound so-called a "rattling noise" is generated due to a backlash existing in the power transmitting path. For solving this problem, it is considered, for example, to provide sound muffler members between the vehicular drive system and vehicular compartments for reducing the transmission of the rattling noise from the vehicular drive system to the vehicular compartments, or to control the electric motor of the vehicular drive system so as to reduce an amount of variation of a vehicle drive torque upon the above-indicated automatic engine starting for preventing the generation of the above-indicated rattling noise. However, the above-described solutions are disadvantageous in that the provision of the above-described sound muffler members increases the number of parts of the vehicle and the cost of manufacture of the vehicle, and the above-indicated control of the electric motor is difficult and does not permit complete elimination of generation of the rattling noise.

The present invention was made in view of the background art described above. It is therefore an object of the present invention to provide a control apparatus for a drive system of a vehicle, which permits economical and easy reduction of generation of an abnormal sound upon engine starting in a running state of the vehicle.

Means for Achieving the Object

The object of the first aspect of the invention is achieved according to the present invention, which provides (1) a control apparatus for a drive system of a vehicle provided with a first drive wheel and a second drive wheel each of which is rotated by an output of an engine transmitted thereto, and a differential limiting device configured to limit a differential rotary motion between the above-described first drive wheel and the above-described second drive wheel, the control apparatus being provided with automatic engine starting determining means for determining whether a predetermined automatic engine starting condition is satisfied while the above-described engine is at rest in a running state of the vehicle, and automatic engine starting control means for automatically starting the above-described engine when it is determined that the above-described automatic engine starting condition is satisfied, (2) the control apparatus being characterized by comprising on-engine-starting differential limiting means for commanding the above-described differential limiting device to limit the differential rotary motion between the above-described first drive wheel and the above-described second drive wheel, upon automatic starting of the above-described engine under the control of said automatic engine starting control means.

In the second aspect of the invention, (1) the above-described first drive wheel and the above-described second drive wheel are front and rear drive wheels driven by the above-described engine through a center differential gear device, and (2) the above-described differential limiting device is provided in the above-described center differential gear device, to limit a differential rotary motion between the above-described front and rear drive wheels.

In the third aspect of the invention, (1) the above-described first drive wheel and the above-descried second drive wheel are a pair of right and left drive wheels driven by the above-described engine through a differential gear device, and (2) wherein the above-described differential limiting device is provided in the above-described differential gear device, to limit a differential rotary motion between the above-described pair of right and left drive wheels.

In the fourth aspect of the invention, the above-described on-engine-starting differential limiting means limits the differential rotary motion between the above-described first drive wheel and the above-described second drive wheel, on the basis of a drive torque varying due to starting of the above-described engine under the control of the above-described automatic engine starting control means, and according to a stored predetermined relationship.

Advantages of the Invention

The vehicular drive system control apparatus according to the first aspect of the invention comprises the on-engine-starting differential limiting means for commanding the above-described differential limiting device to limit the differential rotary motion between the above-described first drive wheel and the above-described second drive wheel, upon automatic starting of the above-described engine under the control of the above-described automatic engine starting control means. Accordingly, the limitation of the differential rotary motion between the first drive wheel and the second drive wheel by the above-described differential limiting device ensures the starting of the engine without a backlash which exists in the power transmitting path between the engine and the first and second drive wheels due to a circulating torque generated due to a small amount of difference between the diameters of the first and second drive wheels, thereby permitting economical and easy reduction of generation of an abnormal sound upon starting of the engine in a running state of the vehicle, that is, a rattling noise due to the above-indicated backlash. The present control apparatus eliminates a need for providing sound muffler members between the vehicular drive system and vehicular compartments, for example, for reducing the transmission of the rattling noise from the vehicular drive system to the vehicular compartments, and prevents an increase of the number of parts of the vehicle and an increase of costs due to the increase of the number of these parts which would be caused by the provision of those sound muffler members. Further, the present control apparatus does not require a difficult control of an electric motor of the vehicular drive system so as to reduce an amount of variation of a vehicle drive torque upon the starting of the engine, for preventing the generation of the above-indicated rattling noise.

In the vehicular drive system control apparatus according to the second aspect of the invention, the above-described first drive wheel and the above-described second drive wheel are a front drive wheel and a rear drive wheel driven by the above-described engine through a center differential gear device, and the above-described differential limiting device is provided in the above-described center differential gear device, to limit a differential rotary motion between the above-described front and rear drive wheels. In this case, the limitation of the differential rotary motion between the front drive wheels and the rear drive wheels by the differential limiting device ensures the starting of the engine in the running state of the vehicle without the backlash in the power transmitting path between the engine and the front and rear drive wheels, thereby permitting economical and easy reduction of generation of the abnormal sound upon starting of the engine in the running state of the vehicle.

In the vehicular drive system control apparatus according to the third aspect of the invention, the above-described first drive wheel and the above-described second drive wheel are a pair of right and left drive wheels driven by the above-described engine through a differential gear device, and the above-described differential limiting device is provided in the above-described differential gear device, to limit a differential rotary motion between the above-described pair of right and left drive wheels. In this case, the limitation of the differential rotary motion between the pair of right and left drive wheels by the differential limiting device ensures the starting of the engine in the running state of the vehicle without the backlash in the power transmitting path between the engine and the pair of right and left drive wheels, thereby permitting economical and easy reduction of generation of the abnormal sound upon starting of the engine in the running state of the vehicle, even where the vehicle is a front-drive vehicle or a rear-drive vehicle.

In the vehicular drive system control apparatus according to the fourth aspect of the invention, the above-described on-engine-starting differential limiting means limits the differential rotary motion between the above-described first drive wheel and the above-described second drive wheel, on the basis of a drive-force-related value varying due to starting of the above-described engine under the control of the above-described automatic engine starting control means, and according to a stored predetermined relationship. In this case, the backlash in the power transmitting path between the engine and the first and second drive wheels is eliminated with a required minimum amount of differential limitation by the differential limiting device such that a force (differential limiting torque) to limit the differential rotary motion between the first and second drive wheels increases with an increase of the above-described drive-force-related value, for instance, a drive torque. Accordingly, it is possible to prevent reduction of drivability and fuel economy of the vehicle due to an excessively large amount of the differential limitation by the differential limiting device.

MODE FOR CARRYING OUT THE INVENTION

Embodiments of the present invention will be described in detail by reference to the drawings. It is to be understood that the drawings showing the embodiments are simplified or transformed as needed, and do not necessarily accurately indicate the dimensions and shapes of individual elements of the embodiments.

Embodiment 1

Figure 1:
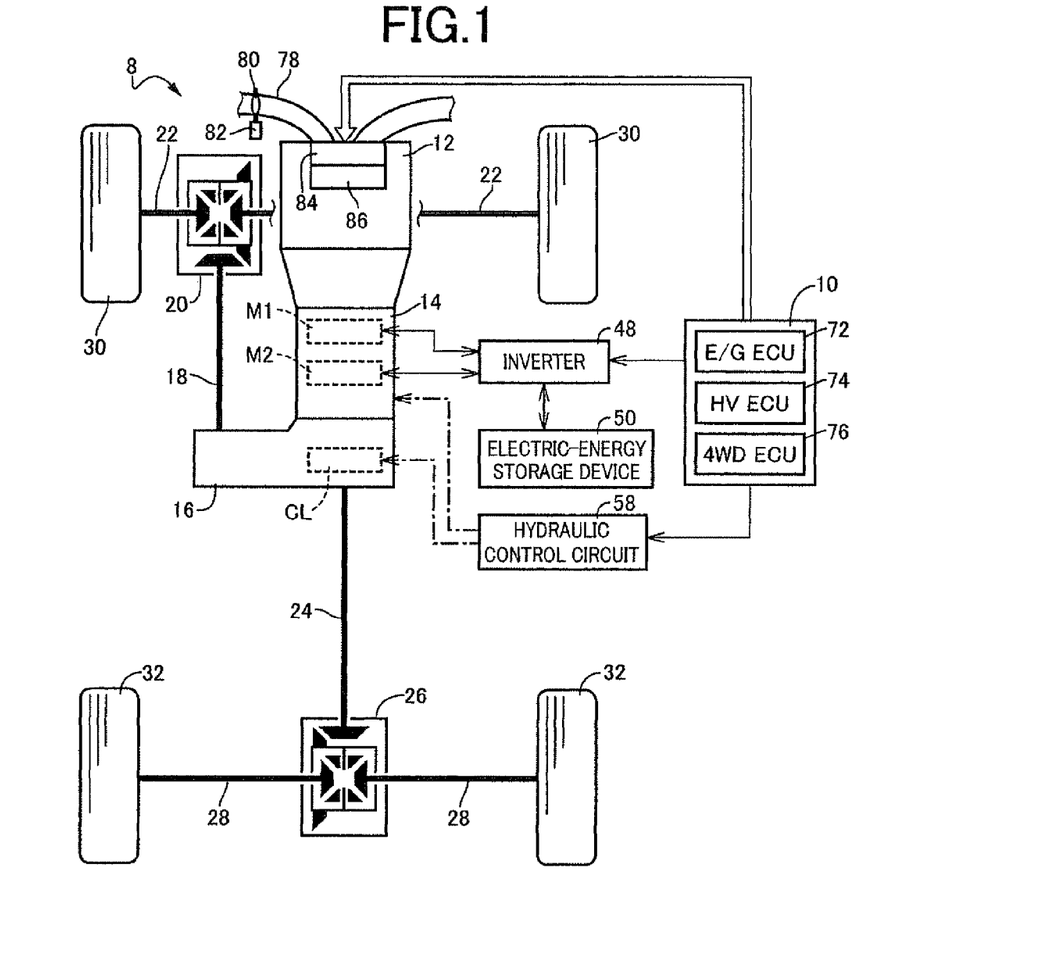
FIG. 1 is a view for explaining a vehicular drive system, and an electronic control device functioning as a control apparatus for the vehicular drive system, which is configured according to one embodiment of this invention.

FIG. 1 is the view for explaining a vehicular drive system 8, and an electronic control device 10 functioning as a control apparatus for the vehicular drive system 8, which is configured according to one embodiment of this invention. This vehicular drive system 8 is suitably used for a hybrid vehicle of a front and rear drive type (four-wheel-drive type), which is basically designed as a front-engine rear-drive (FR) vehicle. As shown in FIG. 1, the vehicular drive system 8 is provided with an engine 12, a power transmitting device 14, a transfer device 16, a front propeller shaft 18, a front wheel differential gear device (front differential) 20, a pair of right and left front wheel axles 22, a rear propeller shaft 24, a rear wheel differential gear device (rear differential) 26, and a pair of right and left rear wheel axles 28. The above-described engine 12, which functions as a drive force source for running, is an internal combustion engine such as a gasoline engine or a diesel engine constructed to produce a drive force by combustion of a fuel injected into cylinder, for example. The drive force (torque) produced by this engine 12 is transmitted to the transfer device 16 through the power transmitting device 14 which is described later. The above-described transfer device 16 is a front/rear power distributing device constructed to distribute the input drive force to the front drive wheels 30 and the rear drive wheels 32. The drive force transmitted to this transfer device 16 is distributed to the front propeller shaft 18 and the rear propeller shaft 24. The drive force transmitted to the front propeller shaft 18 is transmitted to the pair of right and left front drive wheels 30 through the front wheel differential gear device 20 and the front wheel axles 22. The above-described front wheel differential gear device 20 is of a so-called "bevel gear type" well known in the art, which is configured to drive the right and left front wheel axles 22, while permitting a difference between rotating speeds of these front wheel axles 22. On the other hand, the drive force transmitted to the rear propeller shaft 24 is transmitted to the pair of right and left rear drive wheels 32 through the rear wheel differential gear device 26 and the rear wheel axles 28. The above-described rear wheel differential gear device 26 is of a so-called "bevel gear type" well known in the art, which is configured to drive the right and left rear wheel axles 28, while permitting a difference between rotating speeds of these rear wheel axles 28.

Figure 2:
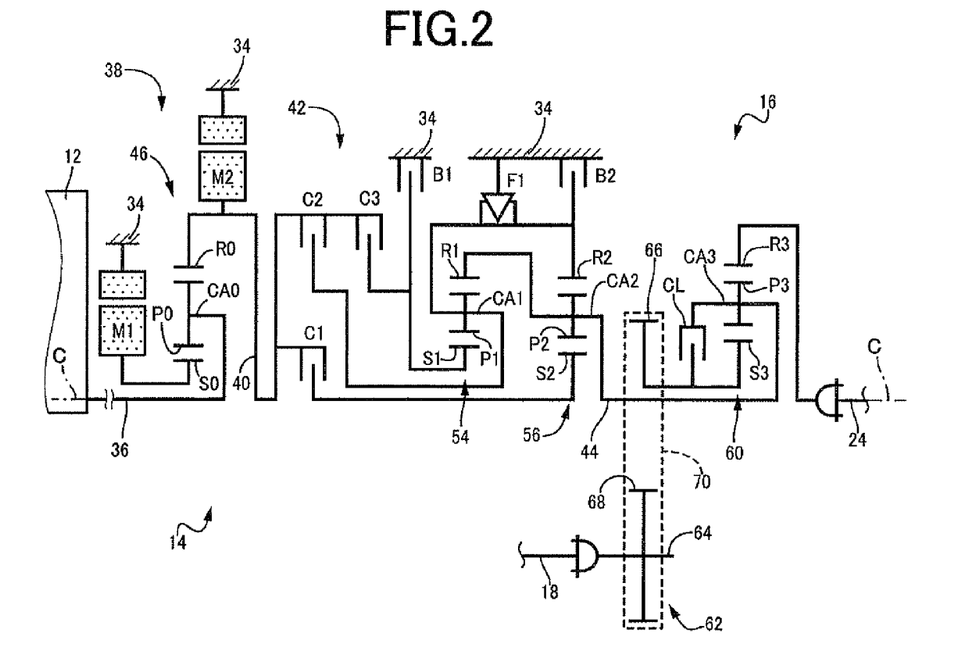
FIG. 2 is a schematic view for explaining an arrangement of a power transmitting device and a transfer device that are shown in FIG. 1.

FIG. 2 is the schematic view for explaining an arrangement of the power transmitting device 14 and the transfer device 16 that are shown in FIG. 1. As shown in FIG. 2, the power transmitting device 14 is provided with: an electric continuously-variable transmission portion 38 having an input shaft 36 connected to a crankshaft of the engine 12 directly, or indirectly through a pulsation absorbing damper (vibration damping device) not shown, for example; a transmission portion 42 connected to the electric continuously-variable transmission portion 38 through a power transmitting member 40; and an output shaft 44 connected to this transmission portion 42. The electric continuously-variable transmission portion 38, transmission portion 42 and output shaft 44 are disposed on a common axis C in series with each other within a stationary member in the form of a transmission casing 34 (hereinafter referred to as "casing 34") which is mounted on the vehicle body. It is noted that lower halves as seen in FIG. 2 of the power transmitting device 14 and a portion of the transfer device 16 disposed in series on the axis C are not shown in the schematic view of FIG. 2, since they are constructed diametrically symmetrically with respect to the axis C.

The electric continuously-variable transmission portion 38 is provided with: a power distributing mechanism 46; a first electric motor M1 operatively connected to the power distributing mechanism 46 so as to control a differential state of the power distributing mechanism 46; and a second electric motor M2 connected to the power transmitting member 40 so as to be rotated with this power transmitting member 40. The electric continuously variable transmission portion 38 is configured to continuously change a speed ratio, which is a ratio of the rotating speed of the power transmitting member 40 to the rotating speed of the input shaft 36. It is noted that the power transmitting member 40 which is an output rotary member of the electric continuously-variable transmission portion 38 also functions as an input rotary member of the transmission portion 42.

Each of the first electric motor M1 and second electric motor M2 (hereinafter collectively referred to as "electric motors M" unless otherwise specified) is a so-called "motor generator" having a function of a motor operable to convert an electric energy into a mechanical drive force, and a function of an electric generator operable to convert a mechanical drive force into an electric energy. The second electric motor M2 functions as a drive power source (auxiliary drive power source) which operates in place of the engine 12 functioning as a main drive power source, or cooperates with the engine 12, to generate the vehicle drive force. The first electric motor M1 is configured to implement a regenerative operation for generating an electric energy which is supplied to the other electric motors M through an inverter 48 (shown in FIG. 1), or stored in an electric energy storage device 50 (shown in FIG. 1).

The power distributing mechanism 46 is a differential gear device which is operatively connected to the engine 12 and which is constituted by a single-pinion type differential-portion planetary gear set, for instance. Namely, the power distributing mechanism 46 is a mechanism configured to mechanically distribute an output of the engine 12 received by the input shaft 36, to the first electric motor M1 and the power transmitting member 40. This power distributing mechanism 46 is provided with: a differential-portion sun gear S0; a differential-portion planetary gear P0; a differential-portion carrier CA0 supporting the differential portion planetary gear P0 such that the planetary gear P0 is rotatable about its axis and an axis of the sun gear S0; and a differential-portion ring gear R0 meshing with the differential-portion sun gear S0 through the differential-portion planetary gear P0 as rotating elements.

In the above-described power distributing mechanism 46, the differential-portion carrier CA0 is connected to the input shaft 36, that is, to the engine 12, and the differential-portion sun gear S0 is connected to the first electric motor M1, while the differential-portion ring gear R0 is connected to the power transmitting member 40. The power distributing mechanism 46 constructed as described above is operable in a differential state in which the rotary elements are rotatable relative to each other to perform a differential function for distributing the output of the engine 12 to the first electric motor M1 and the power transmitting member 40, so that a portion of the distributed output of the engine 12 is used to drive the first electric motor M1 to generate an electric energy which is stored or used to drive the second electric motor M2. Accordingly, the power distributing mechanism 46 is operable in a continuously-variable shifting state in which the power distributing mechanism 46 is operated as an electrically controlled continuously-variable transmission and in which the rotating speed of the power transmitting member 40 is continuously variable, irrespective of the operating speed of the engine 12, with the operating speed of the first electric motor M1 being controlled, so that a speed ratio γ0 of the power distributing mechanism 46 (rotating speed $N_{IN}$ of the input shaft 36/rotating speed $N_{40}$ of the power transmitting member 40) is continuously variable from a minimum value γ0min to a maximum value γ0max.

The transmission portion 42 is a multi-step automatic transmission of a planetary gear type functioning as a step-variable automatic transmission which is provided with a single-pinion type first planetary gear set 54 and a single-pinion type second planetary gear set 56, for example, and which has a plurality of speed ratios that are mechanically established. The first planetary gear set 54 is provided with: a first sun gear S1; a first planetary gear P1; a first carrier CA1 supporting the first planetary gear P1 such that the planetary gear P1 is rotatable about its axis and an axis of the sun gear S1; and a first ring gear R1 meshing with the first sun gear S1 through the first planetary gear P1. The second planetary gear set 56 is provided with: a second sun gear S2; a second planetary gear P2; a second carrier CA2 supporting the second planetary gear P2 such that the planetary gear P2 is rotatable about its axis and an axis of the sun gear S2; and a second ring gear R2 meshing with the second sun gear S2 through the second planetary gear P2.

In the first planetary gear set 54 and second planetary gear set 56 described above, the first sun gear S1 is selectively connected to the power transmitting member 40 through a third clutch C3, and is selectively fixed to the casing 34 through a first brake B1, and the first carrier CA1 is formed integrally with the second ring gear R2. The first carrier CA1 and second ring gear R2 described above are selectively connected to the power transmitting member 40 through a second clutch C2, and selectively fixed to the casing 34 through a second brake B2. Further, the first carrier CA1 and second ring gear R2 are fixed to the stationary member in the form of the casing 34 through a one-way clutch F1 such that the first carrier CA1 and second ring gear R2 are permitted to rotate in the direction of operation of the engine 12, but are inhibited from rotating in the opposite direction. The first ring gear R1 is formed integrally with the second carrier CA2. The first ring gear R1 and second carrier CA2 described above are connected to the output shaft 44. The second sun gear S2 is selectively connected to the power transmitting member 40 through a first clutch C1.

The above-described first clutch C1, second clutch C2, third clutch C3, first brake B1 and second brake B2 (hereinafter collectively referred to as "clutches C" and "brakes B" unless otherwise specified) are hydraulically operated frictional coupling devices well known in the art. These hydraulically operated frictional coupling devices are operated with a pressurized oil supplied from a hydraulic control circuit 58 shown in FIG. 1.

Figure 3:
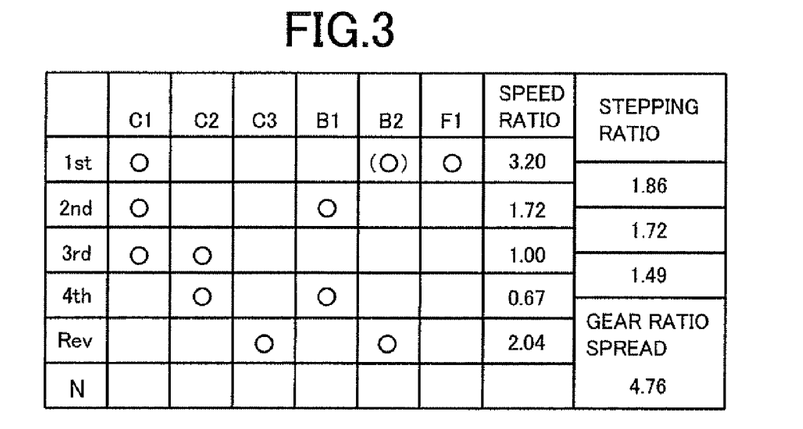
FIG. 3 is a table which is stored in a memory and which indicates engaged states of clutches and brakes for establishing gear positions of a transmission portion in FIG. 2.

The transmission portion 42 constructed as described above has a plurality of gear positions (shift positions) which are selectively established by engaging actions of selected ones of the clutches C and brakes B according to a stored predetermined table of the engaging actions as indicated in FIG. 3. In each of the gear positions, the transmission portion 42 has the speed ratio γ (rotating speed $N_{40}$ of the power transmitting member 40/rotating speed $N_{OUT}$ of the output shaft 44) corresponding to the gear position.

As shown in FIG. 2, the transfer device 16 is provided with a center differential gear device (center differential) 60, and a differential limiting device in the form of a differential limiting clutch CL. The center differential gear device 60 is configured to distribute the drive force transmitted from the transmission portion 42, to the front propeller shaft 18 and the rear propeller shaft 24, and the differential limiting clutch CL is configured to limit a differential rotary motion between the front propeller shaft 18 and rear propeller shaft 24, namely, to limit a differential function of the above-described center differential gear device 60, for thereby controlling the distribution of the front and rear drive forces.

The above-described center differential gear device 60 is principally constituted by a single-pinion type planetary gear device disposed on the axis C in series with the power transmitting device 14. Namely, the center differential gear device 60 is provided with: a third sun gear S3; a third ring gear R3 disposed concentrically with the third sun gear S3; a third carrier CA3 supporting the third planetary gear P3 such that the planetary gear P3 is rotatable about its axis and an axis of the sun gear S3; and a third planetary gear P3 meshing with the third sun gear S3 through the third ring gear R3. The above-described third carrier CA3 is connected to the output shaft 44, and the above-described third ring gear R3 is connected to the rear propeller shaft 24. Further, the above-described third sun gear S3 is connected through a power transmitting device 62 to a shaft 64 which is disposed coaxially with and operatively connected to the front propeller shaft 18. The above-described power transmitting device 62 is provided with: a drive gear 66 connected to the third sun gear S3; a driven gear 68 connected to the shaft 64; and a transmission belt 70 which engages the external teeth of the above-described drive gear 66 and driven gear 68 and which transmits a drive force between these drive gear 66 and driven gear 68. When this center differential gear device 60 is placed in a differential state in which the rotary elements of its planetary gear set described above are rotatable relative to each other, the drive force transmitted from the transmission portion 42 to the third carrier CA3 is distributed to the third sun gear S3 and the third ring gear R3.

The above-descried differential limiting clutch CL is provided to selectively connect the third carrier CA3 of the center differential gear device 60 and the drive gear 66. This differential limiting clutch CL is a hydraulically operated frictional coupling device, like the above-descried clutches C and brakes B, and is of a wet-type multiple-disc configuration having a plurality of friction plates which are superposed on each other and which are forced against each other by a hydraulic actuator, for instance. The above-described hydraulic actuator is operated with the pressurized oil supplied from the hydraulic control circuit 58 shown in FIG. 1. The differential limiting clutch CL is configured to continuously change its torque capacity, that is, a differential limiting torque TL, with the hydraulic pressure in the above-indicated hydraulic actuator being controlled.

Referring back to FIG. 1, the electronic control device 10 is provided to control the operation of the vehicular drive system 8, and functions as the vehicular drive system control apparatus according to the present invention. This electronic control device 10 includes a plurality of so-called "microcomputers", each of which has a CPU, a ROM, a RAM and an output/input interface and is configured to implement various controls by signal processing operations according to control programs preliminary stored in the ROM, while utilizing a temporary data storage function of the RAM. The above-indicated controls include: a hybrid drive control to calculate required outputs of the engine 12 and the electric motors M, and to generate commands for controlling various relevant devices so as to obtain the calculated required outputs; an engine output control to control the output of the engine 12 according to the above-indicated commands; an electric motor output control to control the operations of the electric motors M as the drive power source or electric generator according to the above-indicated commands; and a differential limiting torque control to control the differential limiting torque TL of the differential limiting clutch CL for controlling the distribution of the front and rear drive forces. The electronic control device 10 according to the present embodiment is provided with: an engine output control portion 72 constituted by a so-called "engine control computer E/G ECU" configured to implement the above-described engine output control; a hybrid control portion 74 constituted by a so-called "hybrid control computer HV ECU" configured to implement the above-described hybrid drive control and electric motor output control; and a four-wheel-drive control portion 76 constituted by a so-called "four-wheel-drive control computer 4WD ECU" configured to implement the above-described differential limiting torque control. The engine output control portion 72, hybrid control portion 74 and four-wheel-drive control portion 76 are communicable with each other.

The above-described electronic control device 10 is further configured to receive various input signals from various sensors and switches provided in the vehicle. These input signals include; a signal indicative of an operating speed $N_E$ of the engine 12; a signal indicative of a cooling water temperature $T_W$ of the engine 12; a signal indicative of an operating speed $N_{M1}$ of the first electric motor M1; a signal indicative of an operating speed $N_{M2}$ of the second electric motor M2; a signal indicative of a running speed V of the vehicle; a signal indicative of the shift position; a signal indicative of an accelerator operation amount $A_{CC}$ which is an amount of operation of an accelerator pedal and which represents a vehicle output required by the vehicle operator; a signal indicative of an amount SOC of electric energy stored in (a state of charging of) the electric energy storage device 50; and a signal indicative of a battery temperature of the electric-energy storage device 50.

The above-described electronic control device 10 is configured to generate various output signals including: a drive signal to drive a throttle actuator 82 for controlling an angle of opening of an electronic throttle valve 80 provided in intake pipe 78 of the engine 12; a fuel supply amount signal to control an amount of supply of a fuel into the cylinders of the engine 12 by a fuel injection device 84; an ignition signal to command an ignition device 86 to ignite the fuel in the engine 12; signals to operate the electric motors M; valve control signals to operate solenoid-operated valves incorporated in the hydraulic control circuit 58, for controlling hydraulic actuators of the hydraulically operated frictional coupling devices of the electric continuously-variable transmission portion 38 and the transmission portion 42; a signal to command a regulator valve (pressure adjusting valve) incorporated in the hydraulic control circuit 58, for regulating a hydraulic line pressure; and a drive command signal to operate an electrically operated hydraulic pump provided as a hydraulic pressure source which generates a hydraulic pressure to be adjusted to the line pressure.

Figure 4:
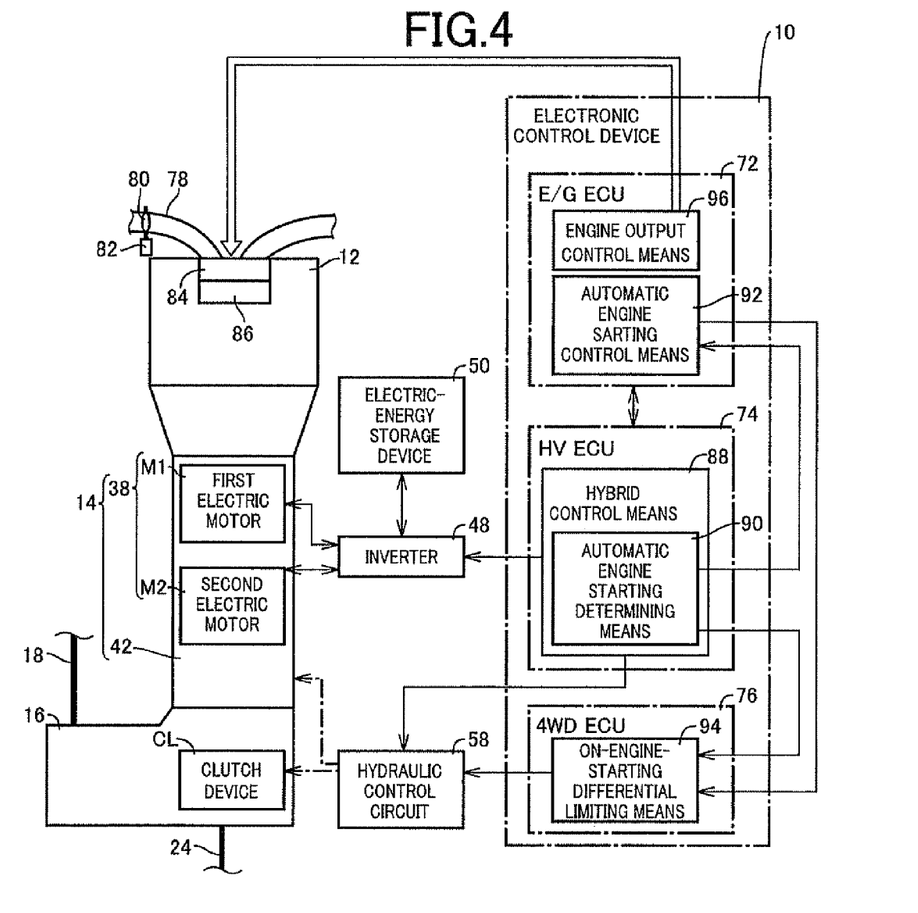
FIG. 4 is a functional block diagram for explaining major control functions of the electronic control device shown in FIG. 1.

FIG. 4 is the functional block diagram for explaining major control functions of the electronic control device 10. As shown in FIG. 4, the hybrid control portion 74 is provided with hybrid control means 88 for controlling the engine 12 and electric motors M according to the various signals transmitted from the various sensors and switches to the electronic control device 10. For example, the hybrid control means 88 commands the engine output control portion 72 to operate the engine 12 in an operating state of high efficiency, and optimizes a proportion of the drive forces produced by the engine 12 and the second electric motor M2, and a reaction force generated by a regenerative operation of the first electric motor M1, for thereby controlling the speed ratio γ0 of the electric continuously-variable transmission portion 38 operated as an electrically controlled continuously-variable transmission. Described more specifically, the hybrid control portion 88 commands the engine output control portion 72 to establish the engine speed $N_E$ and torque for obtaining the operator's required vehicle output calculated on the basis of the accelerator operation amount $A_{CC}$ and vehicle speed V, and controls the speed ratios of the electric continuously-variable transmission portion 38 and the transmission portion 42.

The hybrid control means 88 permits the vehicle to run in a motor drive mode (electric drive mode or EV drive mode) with only the second electric motor M2 used as the vehicle drive power source, by commanding the second electric motor M2 to operate with the electric energy supplied from the electric-energy storage device 50 while the engine 12 is held at rest. For instance, the above-described motor drive mode is established if all of predetermined motor-drive permitting conditions including the following condition are satisfied: a condition that the electric energy amount SOC stored in the electric-energy storage device 50 is equal to or larger than a predetermined threshold value; a condition that the vehicle speed V is equal to or lower than a predetermined threshold value; a condition that the operation amount of the accelerator pedal, namely, the accelerator operation amount $A_{CC}$ is equal to or smaller than a predetermined threshold value; and a condition that the engine cooling water temperature $T_W$ is equal to or higher than a predetermined threshold value.

The hybrid control means 88 also has functions of engine stop determining means for determining whether the engine 12 is at rest, and motor drive determining means for determining whether the vehicle is in the motor-drive mode. Further, the hybrid control means 88 is provided with automatic engine starting determining means 90 for determining whether a predetermined automatic engine starting condition is satisfied. This determination is made while the engine stop determining means determines that the engine 12 is at rest and while the motor drive determining means determines that the vehicle is in the motor drive mode. In the present embodiment, the determination as to whether the above-described predetermined automatic engine starting condition is satisfied or not is made by determining whether at least one of the above-described motor-drive permitting conditions is not satisfied.

The engine output control portion 72 is provided with automatic engine starting control means 92 for automatically starting the engine 12 when the automatic engine starting determining means 90 has determined that the above-described automatic engine starting condition is satisfied. For instance, the automatic engine starting control means 92 automatically starts the engine 12, by operating the first electric motor M1 while the second electric motor M2 is operated to generate additionally the reaction torque at the time of automatic starting of the engine 12, such that the first electric motor speed $N_{M1}$ is raised to raise the engine speed $N_E$ to a value not lower than a predetermined engine starting lower limit above which the engine 12 can be started. At the same time, the automatic engine starting control means 92 commands the engine output control portion 72 to command the fuel injection device 84 to supply the fuel and to command the ignition device 86 to ignite the fuel. The automatic engine starting control means 92 is further configured to determine whether the engine 12 has been started or not. This determination is made by determining whether the engine speed $N_E$ has been raised to a predetermined starting completion value $N_E'$. This starting completion value $N_E'$ is a lower limit of the engine speed $N_E$ above which the engine 12 can be kept operated by itself. The starting completion value $N_E'$ is obtained in advance by experimentation. In other words, the automatic engine starting control means 92 is functionally provided with means for determining whether the engine has been started with complete combustion.

The engine output control portion 72 is provided with engine output control means 96, which is configured to implement the engine output control according to a command received from the hybrid control means 88. For example, the engine output control means 96 implements: a throttle control by commanding the throttle actuator 82 to open and close the electronic throttle valve 80; a fuel injection control by controlling the amount and timing of the fuel injection by the fuel injection device 84; and an ignition timing control by controlling the timing of ignition by the ignition device 86 such as an igniter.

The four-wheel-drive control portion 76 is functionally provided with differential limiting torque control means for controlling the differential limiting torque TL of the differential limiting clutch CL. Described more specifically, the four-wheel-drive control portion 76 is configured to control the differential limiting torque TL in a running state of the vehicle on a low-friction surface roadway, a rough ground or any other bad surface roadway, for instance, by controlling the pressure of the pressurized oil to be supplied from the hydraulic control circuit 58 to the hydraulic actuator of the differential limiting clutch CL, according to a predetermined relationship between the pressure of the pressurized oil supplied to the above-indicated hydraulic actuator and the differential limiting torque TL.

Figure 5:
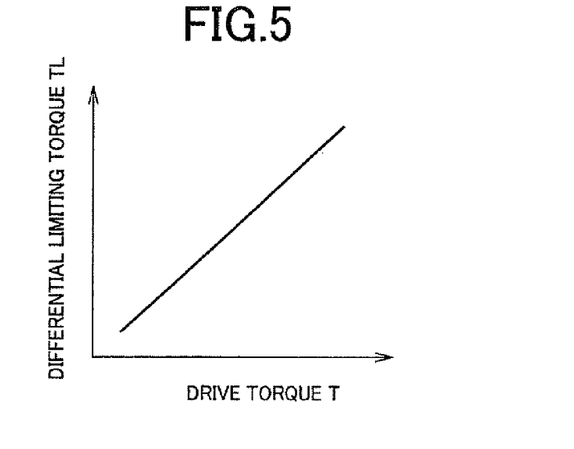
FIG. 5 is a view indicating a stored relationship between a differential limiting torque of a differential limiting clutch shown in FIG. 1, and a hydraulic pressure of a hydraulic actuator of the differential limiting clutch.

The four-wheel-drive control portion 76 is further provided with on-engine-starting differential limiting means 94 for commanding the differential limiting clutch CL to limit a differential rotary motion between the front propeller shaft 18 and the rear propeller shaft 24, that is, a differential rotary motion between the front drive wheels 30 and the rear drive wheels 32, upon automatic starting of the engine 12 under the control of the automatic engine starting control means 92. In the present embodiment, the on-engine-starting differential limiting means 94 is configured to temporarily implement the differential limiting control by the differential limiting clutch CL in advance of the automatic starting of the engine 12 which is effected by the automatic engine starting control means 92 as a result of the determination by the automatic engine starting determining means 90 that the above-described automatic engine starting condition is satisfied. The on-engine-starting differential limiting means 94 is further configured to calculate a vehicle-drive-force-related value in the form of a vehicle drive torque T, for instance, which varies depending upon a running state of the vehicle upon automatic starting of the engine 12 under the control of the automatic engine starting control means 92, and to implement the differential limiting control by the differential limiting clutch CL on the basis of the calculated vehicle drive torque T, and according to a preliminary stored relationship between the vehicle drive torque T and the differential limiting torque TL, as indicated in FIG. 5 by way of example. In the present embodiment, the on-engine-starting differential limiting means 94 controls the hydraulic pressure of the hydraulic actuator of the differential limiting clutch CL, such that the differential limiting torque TL generated by the differential limiting clutch CL increases with an increase of the calculated vehicle drive torque T, as indicated in FIG. 5. The on-engine-starting differential limiting means 94 is further configured to complete (terminate) the differential limiting control by the above-described differential limiting clutch CL, when the automatic engine starting control means 92 has determined that the automatic starting of the engine 12 is completed.

Figure 6:
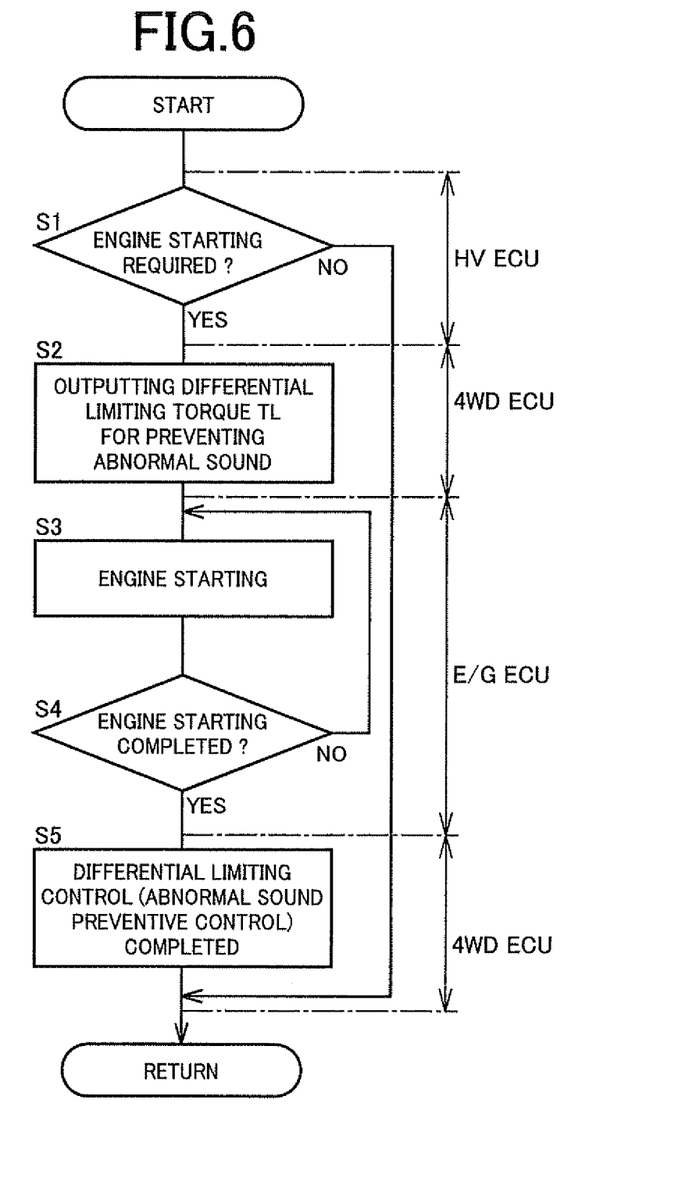
FIG. 6 is a flow chart illustrating a major control operation of the electronic control device shown in FIG. 1, namely, a control operation for automatically starting an engine according to an automatic engine starting command while the engine is at rest in a motor drive mode of the vehicle.

FIG. 6 is the flow chart illustrating a major control operation of the electronic control device 10, namely, a control operation for automatically starting the engine 12 according to an automatic engine starting command while the engine 12 is at rest in the motor drive mode of the vehicle. The control operation of this flow chart is repeatedly performed with an extremely short cycle time of about several milliseconds to about several tens of milliseconds, for example, when the engine 12 is at rest in the motor drive mode of the vehicle, for instance.

The control operation of FIG. 6 is initiated with step S1 (hereinafter "step" being omitted) corresponding to the automatic engine starting determining means 90, to determine whether the predetermined automatic engine starting condition is satisfied or not. In the present embodiment, an affirmative determination that the predetermined automatic engine starting condition is satisfied is obtained when at least one of the above-described motor-drive permitting conditions is not satisfied.

If a negative determination is obtained in the above-described S1, the present control routine is terminated. If the affirmative determination is obtained, the control flow goes to S2 corresponding to the on-engine-starting differential limiting means 94, in which the differential limiting clutch CL is controlled to temporarily limit the differential rotary motion between the front propeller shaft 18 and the rear propeller shaft 24, namely, the differential rotary motion between the front drive wheels 30 and the rear drive wheels 32 in order to prevent noise due to backlash in starting the engine. For instance, the vehicle drive torque T which varies depending upon the running state of the vehicle upon automatic starting of the engine 12 is calculated, and the differential limiting control is implemented by the differential limiting clutch CL on the basis of the calculated vehicle drive torque T, and according to the preliminary stored relationship between the vehicle drive torque T and the differential limiting torque TL, as indicated in FIG. 5 by way of example. In the present embodiment, the hydraulic pressure of the hydraulic actuator of the differential limiting clutch CL is controlled such that the differential limiting torque TL by the differential limiting clutch CL increases with an increase of the calculated vehicle drive torque T, as indicated in FIG. 5.

The control flow then goes to S3 corresponding to the automatic engine starting control means 92 and engine output control means 96, in which the first electric motor M1 is energized to raise the first electric motor speed $N_{M1}$ for raising the engine speed $N_E$ to a value not lower than the predetermined engine starting lower limit, for example, an idling engine speed $N_{EIDL}$, above which the engine 12 can be started, and the fuel injection device 84 is operated to supply the fuel into the engine 12, and the ignition device 86 is operated to ignite the fuel, whereby the engine 12 is started.

Then, S4 corresponding to the automatic engine starting control means 92 is implemented to determine whether the engine 12 has been started or not, by determining whether the engine speed $N_E$ has been raised to the predetermined starting completion value $N_E'$, which is the lower limit of the engine speed $N_E$ above which the engine 12 can be kept operated by itself, or above which it is considered that the engine 12 has been started with complete combustion.

If a negative determination is obtained in the above-described S4, the control flow goes back to the S3. If an affirmative determination is obtained, the control flow goes to S5 corresponding to the on-engine-starting differential limiting means 94, to terminate the differential limiting control implemented in the above-described S2 by the differential limiting clutch CL, whereby the present control routine is terminated.

The control apparatus in the form of the electronic control device 10 for the vehicular drive system 8 according to the present embodiment includes the on-engine-starting differential limiting means 94 for commanding the differential limiting clutch CL (differential limiting device) to limit the differential rotary motion between the front drive wheels 30 (first drive wheels) and the rear drive wheels 32 (second drive wheels), in advance of the automatic starting of the engine 12 under the control of the automatic engine starting control means 92. Accordingly, the limitation of the differential motion between the front drive wheels 30 and the rear drive wheels 32 by the differential limiting clutch CL ensures the starting of the engine 12 without a backlash which exists in the power transmitting path between the engine 12 and the front and rear drive wheels 30, 32, thereby permitting easy and economical reduction of generation of an abnormal sound upon starting of the engine 12 in a running state of the vehicle, that is, a rattling noise due to the above-indicated backlash. Namely, the differential limiting torque TL generated by the differential limiting clutch CL upon starting of the engine eliminates a meshing backlash of splined members or other mutually meshing members in the drive line (power transmitting path) of the vehicle, which meshing backlash is caused by a circulating torque generated due to a small amount of difference between the diameters of the front drive wheels 30 and the rear drive wheels 32, that is, due to a differential rotary motion between the front and rear drive wheels 30, 32, so that the generation of the abnormal sound due to the above-described backlash can be effectively prevented even if the vehicle drive torque varies upon starting of the engine 12. Therefore, the electronic control device 10 eliminates a need for providing sound muffler members between the vehicular drive system 8 and vehicular compartments, for example, for reducing the transmission of the rattling noise from the vehicular drive system 8 to the vehicular compartments, and prevents an increase of the cost of manufacture of the vehicle which would be caused by the provision of those sound muffler members. Further, the electronic control device 10 does not require a difficult control of the electric motors M so as to reduce an amount of variation of a vehicle drive torque upon the starting of the engine 12, for preventing the generation of the above-indicated rattling noise.

According to the electronic control apparatus 10 of the present embodiment, the on-engine-starting differential limiting means 94 calculates the drive torque T which varies upon starting of the engine 12 under the control of the automatic engine starting control means 92, and limits the differential rotary motion between the front drive wheels 30 and the rear drive wheels 32, on the basis of the drive torque T and according to the stored predetermined relationship. Accordingly, the backlash in the power transmitting path between the engine 12 and the front and rear drive wheels 30, 32 is eliminated with a required minimum amount of differential limitation by the differential limiting clutch CL such that a force to limit the differential rotary motion between the front and rear drive wheels 30, 32, namely, the differential limiting torque TL increases with an increase of the drive torque T. Thus, it is possible to prevent reduction of drivability and fuel economy of the vehicle due to an excessively large amount of the differential limitation by the differential limiting clutch CL.

Embodiment 2

Another embodiment of this invention will be described next. In the embodiment described below, the same reference signs will be used to identify the elements that are identical with those in the preceding embodiment, and the description of these elements is omitted.

Figure 7:
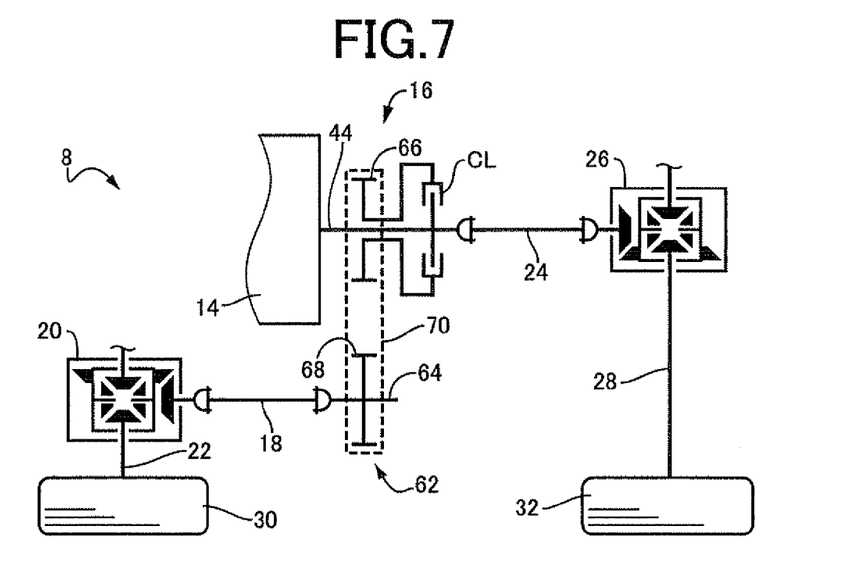
FIG. 7 is a view for explaining an arrangement of a vehicular drive system according to another embodiment of this invention.

FIG. 7 is the view for explaining an arrangement of the vehicular drive system 8 according to another embodiment of the present invention. As shown in FIG. 7, the transfer device 16 in this embodiment is provided with: the power transmitting device 62 having the drive gear 66 connected to the output shaft 44, the driven gear 68 connected to the front propeller shaft 18, and the transmission belt 70 connecting the drive gear 66 and the driven gear 68, for transmitting the drive force from the output shaft 44 to the front propeller shaft 18; and the differential limiting clutch CL for selectively connecting the output shaft 44 integrally connected to the rear propeller shaft 24, to the drive gear 66 of the power transmitting device 62. The transfer device 16 in the present embodiment is not provided with the center differential gear device 60 provided in the preceding embodiment 1. In the transfer device 16 constructed as described above, the differential limiting torque TL is controlled by controlling the hydraulic pressure of the hydraulic actuator of the differential limiting clutch CL so as to obtain the desired differential limiting torque TL, according to the predetermined relationship between the hydraulic pressure of the above-described hydraulic actuator and the differential limiting torque TL. For example, the hydraulic pressure of the above-described hydraulic actuator is controlled such that the force to limit the differential rotary motion between the front drive wheels 30 and the rear drive wheels 32, namely, the differential limiting torque TL increases with an increase of the drive torque T which varies upon starting of the engine 12, as in the embodiment 1.

The control apparatus in the form of the electronic control device 10 for the vehicular drive system 8 according to the present embodiment having the same arrangement as the above-described embodiment 1, except for the aspects described above, includes the on-engine-starting differential limiting means 94 for commanding the differential limiting clutch CL (differential limiting device) to limit the differential rotary motion between the front drive wheels 30 (first drive wheels) and the rear drive wheels 32 (second drive wheels), in advance of the automatic starting of the engine 12 under the control of the automatic engine starting control means 92. Accordingly, the limitation of the differential rotary motion between the front drive wheels 30 and the rear drive wheels 32 by the differential limiting clutch CL ensures the starting of the engine 12 in the running state of the vehicle without the backlash in the power transmitting path between the engine 12 and the front and rear drive wheels 30, 32, thereby permitting economical and easy reduction of generation of the rattling noise upon starting of the engine in the running state of the vehicle, as in the embodiment 1.

Embodiment 3

Figure 8:
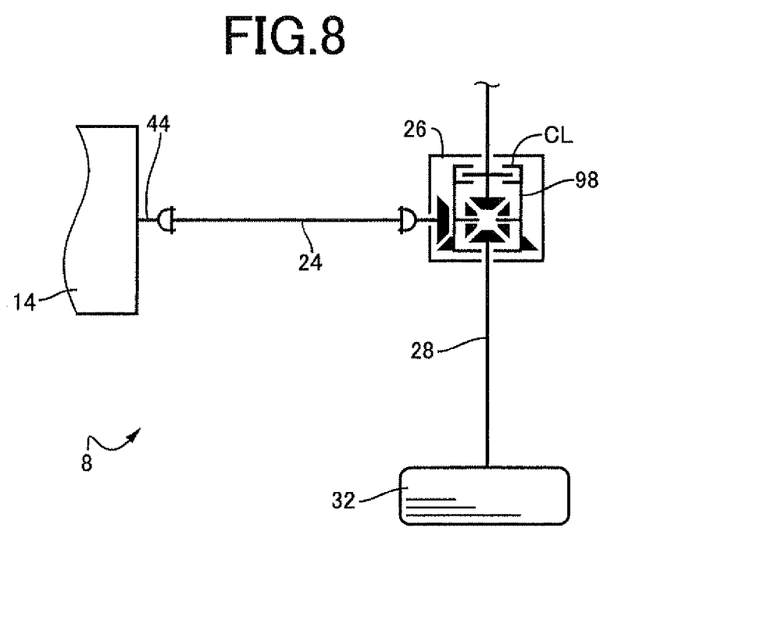
FIG. 8 is a view for explaining an arrangement of a vehicular drive system according to a further embodiment of this invention.

FIG. 8 is the view for explaining an arrangement of the vehicular drive system 8 according to a further embodiment of this invention. The vehicular drive system 8 according to the present embodiment is suitably used for a rear-wheel-drive (FR) vehicle having a pair of right and left rear drive wheels 32, and is not provided with the transfer device 16 provided in the embodiment 1. The rear wheel differential gear device 26 is provided with the differential limiting clutch (differential limiting device) CL configured to connect a differential casing 98 selectively to one of the rear wheel axles 28. The above-described differential limiting clutch CL limits the differential rotary motion between the right and left rear drive wheels 32. In this rear wheel differential gear device 26, the differential limiting torque TL is controlled by controlling the hydraulic pressure of the hydraulic actuator of the differential limiting clutch CL so as to obtain the desired differential limiting torque TL, according to the predetermined relationship between the hydraulic pressure of the above-described hydraulic actuator and the differential limiting torque TL, as in the embodiment 1, for example. For instance, the hydraulic pressure of the above-described hydraulic actuator is controlled such that the force to limit the differential rotary motion between the right and left rear drive wheels 32, namely, the differential limiting torque TL increases with an increase of the drive torque T which varies upon starting of the engine 12.

The control apparatus in the form of the electronic control device 10 for the vehicular drive system 8 according to the present embodiment having the same arrangement as the above-described embodiment 1, except for the aspects described above, includes the on-engine-starting differential limiting means 94 for commanding the differential limiting clutch CL (differential limiting device) to limit the differential rotary motion between the pair of the right and left rear drive wheels 32 (second drive wheels), in advance of the automatic starting of the engine 12 under the control of the automatic engine starting control means 92. Accordingly, the limitation of the differential rotary motion between the pair of right and left rear drive wheels 32 by the differential limiting clutch CL ensures the starting of the engine 12 in the running state of the vehicle without the backlash in the power transmitting path between the engine 12 and the rear drive wheels 32, thereby permitting economical and easy reduction of generation of the rattling noise upon starting of the engine in the running state of the vehicle, as in the embodiment 1.

While the embodiments of this invention have been described in detail by reference to the drawings, it is to be understood that the present invention is not limited to the illustrated embodiments, but may be otherwise embodied.

For example, the differential limiting clutch (differential limiting device) CL is not limited to a hydraulically operated clutch as provided in the illustrated embodiments, and may be an electromagnetic clutch or a magnetic powder clutch, for instance.

In the illustrated embodiment 1, the differential limiting clutch CL provided in the transfer device 16 used for the vehicle provided with the front and rear drive wheels is disposed between the third sun gear S3 and carrier CA3 of the center differential gear device 60. However, the differential limiting clutch CL may be disposed between the third sun gear S3 and the third ring gear R3, or between the third carrier CA3 and the third ring gear R3.

In the illustrated embodiment 2, the differential limiting clutch CL provided in the transfer device 16 used for the vehicle having the front and rear drive wheels may be replaced by a control coupling device disposed at a given position of the front propeller shaft 18 or rear propeller shaft 24, between the front propeller shaft 18 and the front wheel differential gear device 20, or between the rear propeller shaft 24 and the rear wheel differential gear device 26, for example.

In the illustrated embodiment 3, the differential limiting clutch CL provided in the vehicular drive system 8 used for the vehicle having the rear drive wheels is configured to connect the differential casing 98 of the rear wheel differential gear device 26 selectively to one of the rear wheel axles 28. However, the differential limiting clutch CL may be configured to connect one and the other of the rear wheel axles 28, or to connect the differential casing 98 to the other of the rear wheel axles 28.

In the illustrated embodiments 1 and 2, the differential gear devices 20 and 26 of the vehicular drive system 8 used for the vehicle having the front and rear drive wheels do not have a differential limiting function to limit a differential rotary motion between the pair of right and left drive wheels 30, 32. However, the differential gear devices 20, 26 may have the above-described differential limiting function, which may be performed either electrically or mechanically. Where the differential gear devices 20, 26 electrically perform the differential limiting function, the differential limitation may be performed by the above-described differential gear devices 20, 26, in addition to the differential limitation by the differential limiting clutch CL, upon the differential limiting control under the control of the on-engine-starting differential limiting means 94. In this case, the backlash can be more effectively eliminated.

In the illustrated embodiments, the vehicular drive system 8 is used for a vehicle of a front and rear drive type (four-wheel-drive type) basically designed as a front-engine rear-wheel-drive (FR) vehicle, or for a rear-wheel-drive vehicle having the rear drive wheels 32. However, the present invention is equally applicable to a drive system for other types of vehicle, for instance, for a vehicle of a front and rear drive type designed based on a front-engine front-wheel-drive (FF) vehicle, for a front drive vehicle having the front drive wheels 30 or the like.

In the illustrated embodiments, the first electric motor M1 functions as an engine starter. However, another electric motor may be provided as an exclusive engine starter motor.

In the illustrated embodiments, the on-engine-starting differential limiting means 94 is configured to command the differential limiting clutch CL to limit the differential rotary motion between the front drive wheels 30 and the rear drive wheels 32 in advance of automatic starting of the engine 12 under the control of the automatic engine starting control means 92. However, the on-engine-starting differential limiting means 94 may initiate the differential rotation limiting control upon the above-described automatic starting of the engine 12.

In the illustrated embodiments, the on-engine-starting differential limiting means 94 is configured to calculate the drive-force-related value in the form of the vehicle drive torque T, and implement the differential limiting control by the differential limiting clutch CL on the basis of the calculated vehicle drive torque T and according to the predetermined stored relationship. However, the drive torque T may be replaced by another other drive-force-related value such as a vehicle drive force, an output torque of the transmission portion 42, an engine torque, a vehicle acceleration value, an operation amount of the accelerator pedal, and an angle of opening of the throttle valve. The differential limiting torque TL generated by the differential limiting clutch CL may be a predetermined constant value.

The electronic control device 10 in the illustrated embodiments is constituted by three computers, namely, the engine output control portion 72, the hybrid control portion 74 and the four-wheel-drive control portion 76. However, the electronic control device 10 may be constituted by computers including any other computer or computers, or by a single computer.

In the illustrated embodiments 1-3, the power transmitting device 14 is provided with the step-variable transmission portion 42. However, this transmission portion 42 may not be provided, or may be replaced by a continuously-variable transmission portion such as a CVT.

It is to be understood that the foregoing embodiments and modifications have described for illustrative purpose only, and that the present invention may be embodied with various other changes and improvements which may occur to those skilled in the art, without departing from the spirit of this invention.

NOMENCLATURE OF REFERENCE SIGNS

8: Vehicular drive system
10: Electronic control device (Control apparatus)
12: Engine
20: Front wheel differential gear device (Differential gear device)
26: Rear wheel differential gear device (Differential gear device)
30: Front drive wheels
32: Rear drive wheels
60: Central differential gear device
90: Automatic engine starting determining means
92: Automatic engine starting control means
94: On-engine-starting differential limiting means
CL: Differential limiting clutch (Differential limiting device)
T: Drive torque (Drive-force-related value)

The invention claimed is:

1. A control apparatus for a drive system of a vehicle provided with a first drive wheel and a second drive wheel each of which is rotated by an output of an engine transmitted thereto, and a differential limiting device configured to limit a differential rotary motion between said first drive wheel and said second drive wheel, the control apparatus being provided with an automatic engine starting determining portion configured to determine whether a predetermined automatic engine starting condition is satisfied while said engine is at rest in a running state of the vehicle, and an automatic engine starting control portion configured to automatically start said engine when it is determined that said automatic engine starting condition is satisfied, the control apparatus comprising:

on-engine-starting differential limiting portion configured to command said differential limiting device to limit the differential rotary motion between said first drive wheel and said second drive wheel, upon automatic starting of said engine under the control of said automatic engine starting control portion, and wherein said on-engine-starting differential limiting portion limits the differential rotary motion between said first drive wheel and said second drive wheel, on the basis of a drive torque varying upon starting of said engine under the control of said automatic engine starting control portion, and according to a stored predetermined relationship between said drive torque and a differential limiting torque generated by said differential limiting device.

2. The control apparatus according to claim 1, wherein said first drive wheel and said second drive wheel are a front drive wheel and a rear drive wheel driven by said engine through a center differential gear device, and wherein said differential limiting device is provided in said center differential gear device, to limit a differential rotary motion between said front and rear drive wheels.

3. The control apparatus according to claim 1, wherein said first drive wheel and said second drive wheel are a pair of right and left drive wheels driven by said engine through a differential gear device, and wherein said differential limiting device is provided in said differential gear device, to limit a differential rotary motion between said pair of right and left drive wheels.

* * * * *